April 30, 1968 J. K. BROWN ET AL 3,381,175

CIRCUIT-BREAKER ARRANGEMENTS

Filed Sept. 8, 1964 5 Sheets-Sheet 1

United States Patent Office 3,381,175

Patented Apr. 30, 1968

3,381,175

CIRCUIT-BREAKER ARRANGEMENTS

Jack Keyes Brown, Vincent Alfred Hughes, and Thomas Brian Burnett, Stafford, England, assignors to The English Electric Company Limited, London, England, a British company Filed Sept. 8, 1964, Ser. No. 394,676
Claims priority, application Great Britain, Sept. 12, 1963, 35,985/63
4 Claims. (Cl. 317—11)

This invention relates to circuit-breaker arrangements.

An object of the invention is to provide a circuit-breaker arrangement which can be employed for switching lines at high powers and high voltages, e.g. 400 kv.

Another object of the invention is to provide a circuit-breaker arrangement which employs a novel form of electrical switch.

Figure 1:
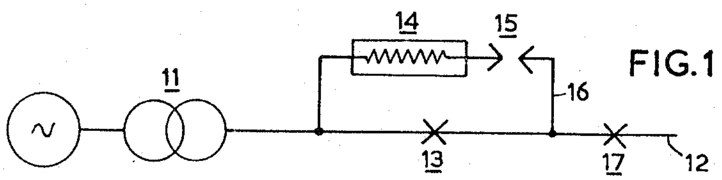
Figure 2:
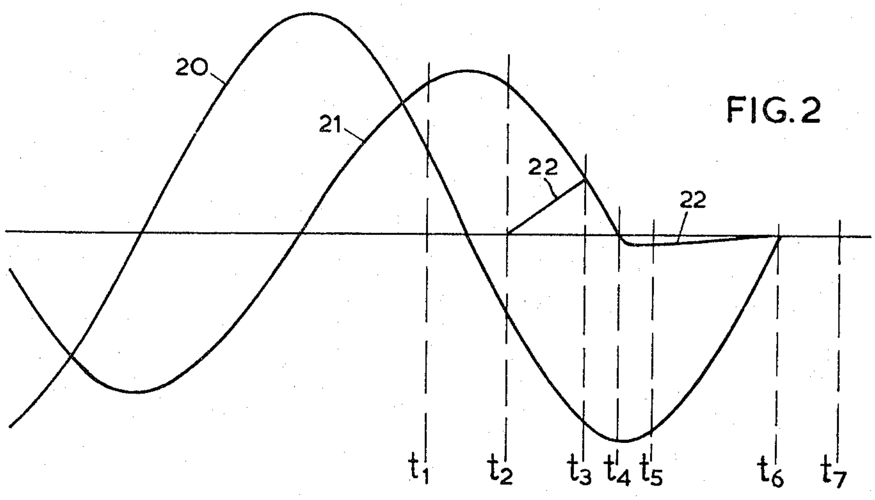
Figure 7:
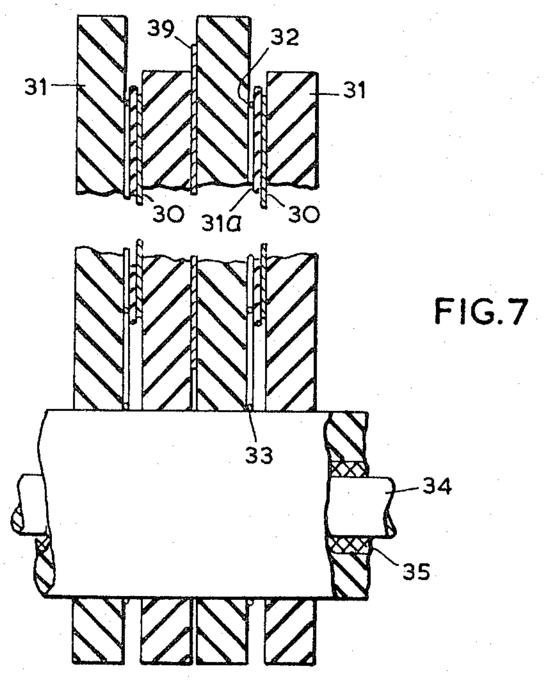
Figure 3:
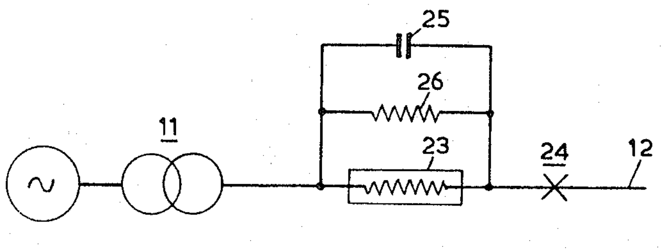
Figure 4:
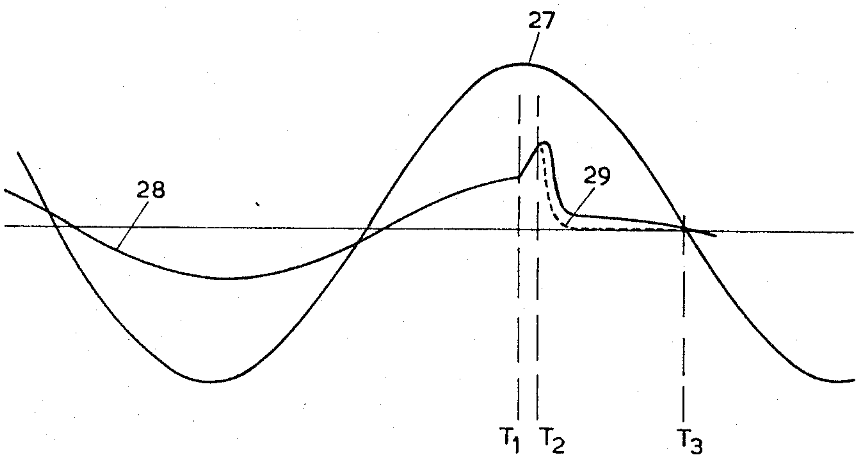
Figure 5:
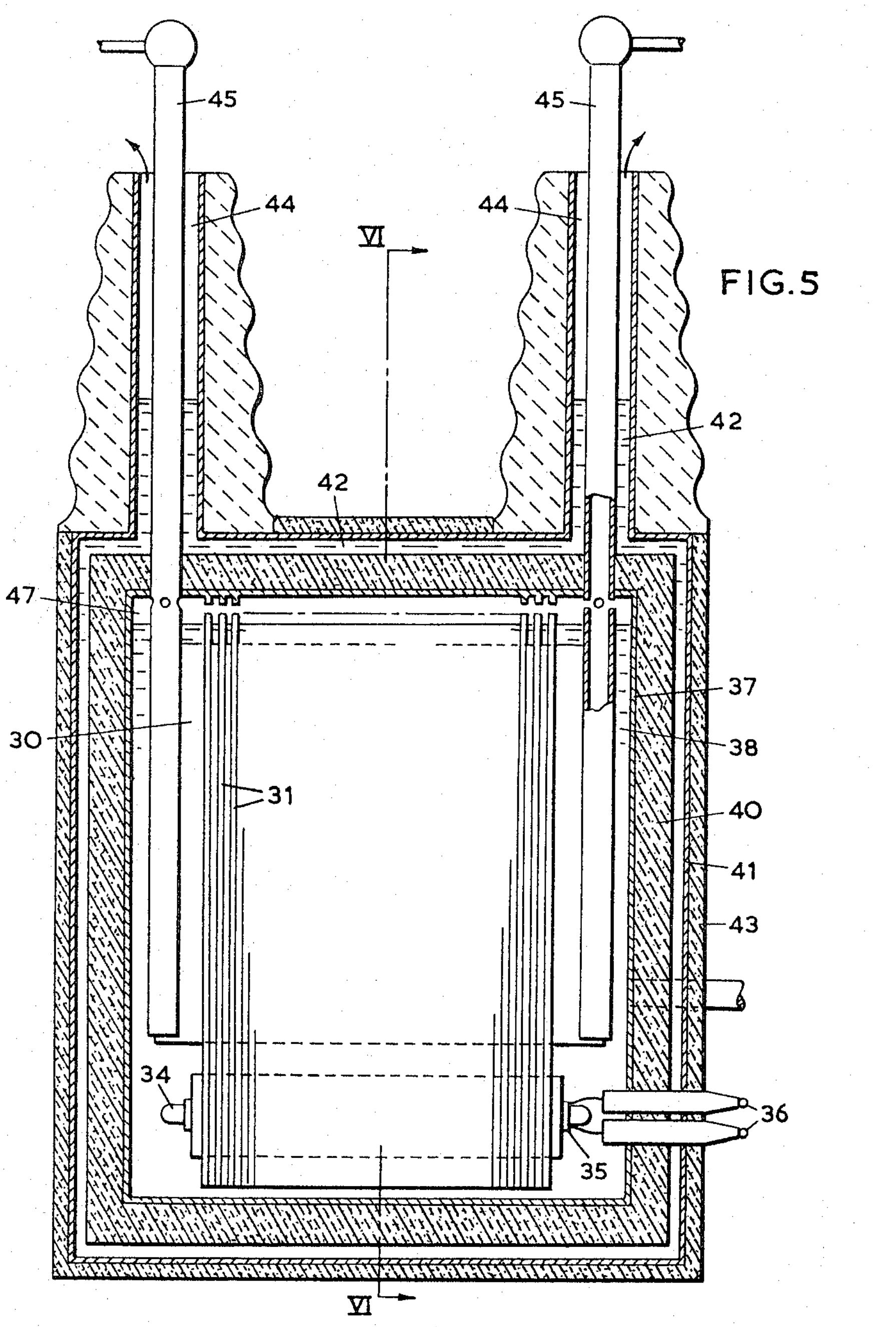
Figure 6:
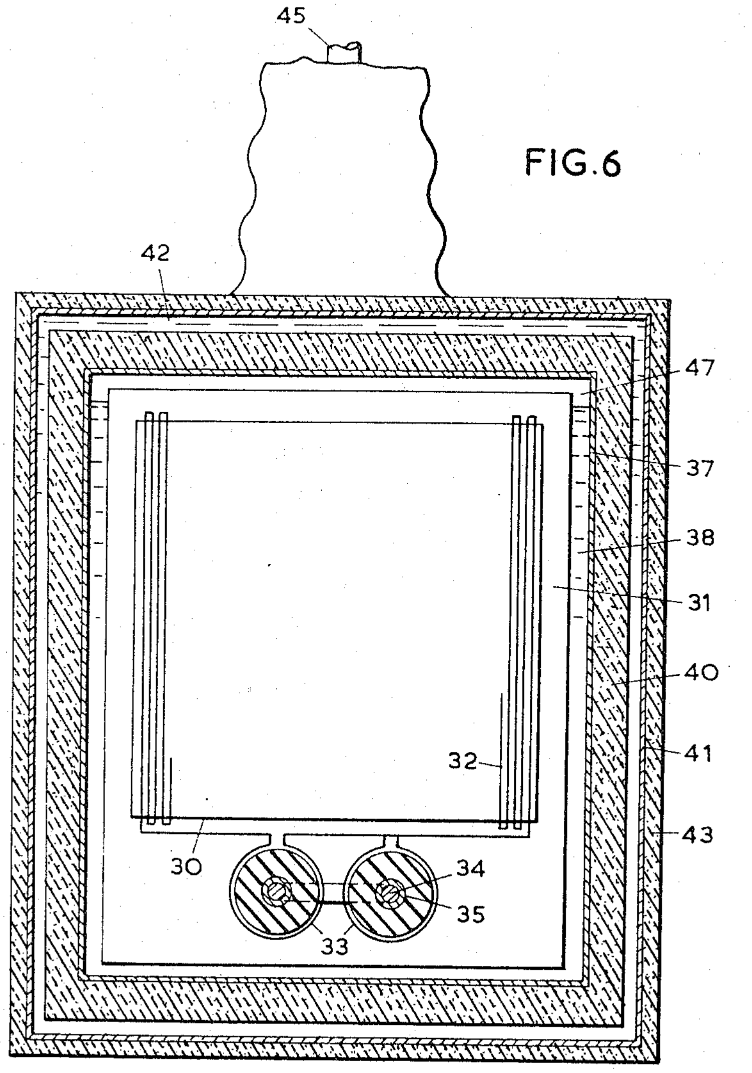
Figure 8:
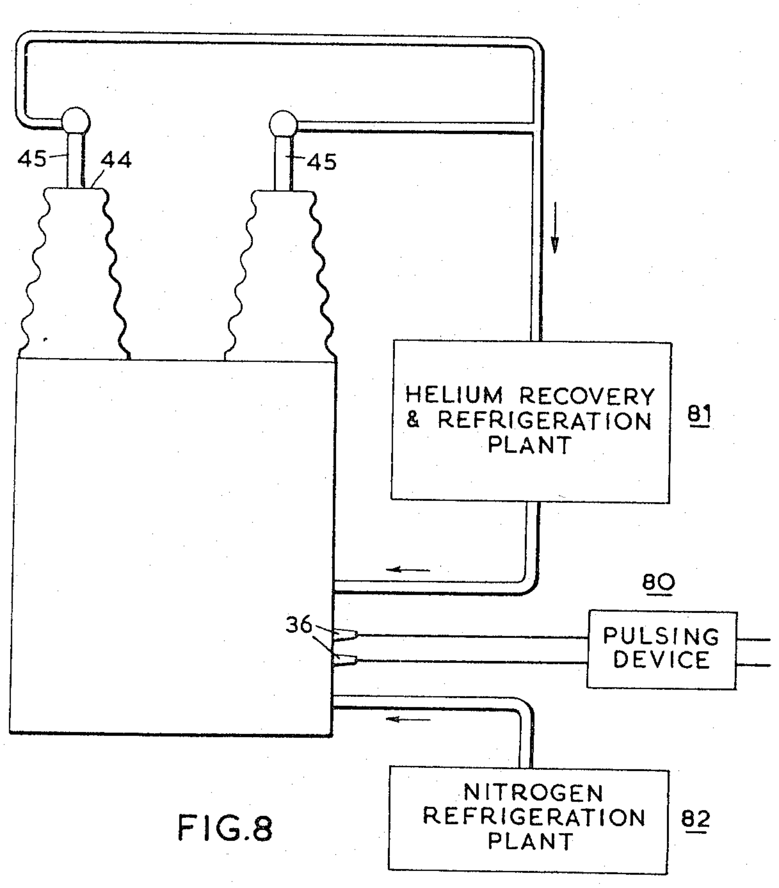

Two embodiments of circuit-breaker arrangement in accordance with the invention will now be described with reference to the accompanying drawings, of which:

FIG. 1 shows diagrammatically one circuit-breaker arrangement,

FIG. 2 is a diagram in which system voltage and fault current for the embodiment of FIG. 1 are plotted against time, FIG. 3 shows diagrammatically a second circuit-breaker arrangement, FIG. 4 is a diagram in which system voltage and fault current for the embodiment of FIG. 2 are plotted against time, FIG. 5 is a diagrammatic view in section of a superconducting switch, FIG. 6 is a section on the line VI—VI of FIG. 5, FIG. 7 is a detail of part of FIG. 5, and FIG. 8 shows diagrammatically the connections of the switch to a pulsing device and refrigeration plants.

Referring now to FIG. 1, the circuit-breaker arrangement shown is suitable for use in a high-power electrical circuit, for example between the generator transformer 11 and the line 12 of a 400 kv. system.

The arrangement includes a normally-closed circuit-breaker 13 of known type, e.g. a heavy-duty gas-blast circuit-breaker, in parallel with which is connected a superconducting switch 14 having in series with it a normally-open circuit-breaker 15 in the parallel circuit 16. In series with the arrangement just described is a further circuit-breaker 17. The circuit-breakers 15, 17 may be of known types appropriate to the duty to be performed. For example, the circuit-breakers 13, 15, 17 may be as described and claimed in United States Patent No. 3,167,630. There will also be provided suitable protective relays connected to the circuit-breakers 13, 15, 17, to operate them, the details of which form no part of the present invention and will therefore not be described. The relay connected to circuit-breaker 13 is arranged to cause the circuit-breaker to open immediately a fault occurs. The relay connected to circuit-breaker 15 is arranged to operate after the occurrence of the fault, but at a predetermined time before a current zero, to close the circuit-breaker 15. The relay connected to circuit-breaker 17 is arranged to operate after the relays connected to circuit-breakers 13, 15, and to open the circuit-breaker 17 after the current zero. The superconducting switch 14 is described in greater detail below.

Means are provided, including a helium refrigeration plant 81 and nitrogen refrigeration plant 82, for maintaining the superconductor element of the superconducting switch 14 below its transition temperature, which for niobium is 9° K. Means are also provided, including a relay and a pulsing device 80, to apply a critical magnetic field to the superconductor element precisely at current zero to switch it from the superconducting state to the normal high-resistance state.

The operation of the circuit-breaker arrangement will be described with reference to FIG. 2, in which the trace 20 represents the system voltage of the alternating current system, and the trace 21 represents the fault current, part 22 of this trace 21 representing the current in the superconductor element.

When a fault condition occurs, the relay connected to circuit-breaker 13 operates to open the circuit-breaker, for example at time $t_1$ in FIG. 2. The circuit-breaker 13 continues to carry current, due to the striking of an arc across its contacts. Next the relay connected to normally-open circuit-breaker 15 operates to close the circuit-breaker at a suitable instant $t_2$ before current zero, and the current is thus transferred from circuit-breaker 13 to circuit 16, which includes the superconducting switch 14 and circuit-breaker 15. It will be appreciated that the superconductor element at this stage is in the superconducting state, that is, it is below the transition temperature and has substantially zero resistance. The superconductor element is also of low inductance. The transfer of current to circuit 16 takes place by time $t_3$, which is appreciably before current zero. In the interval between the transfer of current to circuit 16 and current zero, circuit-breaker 13 clears and develops its full withstand voltage.

Precisely at current zero, at time $t_4$ in FIG. 2, the superconducting switch 14 is switched, by means of a relay which detects current zero, from the superconducting state to the normal high-resistance state, and thus limits the current in circuit 16 to a few amperes. The superconducting switch 14 is preferably switched by means of the pulsing device 80 which applies a critical magnetic field to the superconductor element through a control winding in juxtaposition with the superconductor element, as will be more fully described below. The control winding is supplied through a pulse transformer.

The relay connected to series circuit-breaker 17 then operates to open the circuit-breaker at time $t_5$, and the latter interrupts the circuit at the next current zero which is now close to the voltage zero, i.e. at time $t_6$. There is thus little tendency for a restrike across the contacts of circuit-breaker 17 to occur. When circuit-breaker 17 has cleared, the normally-open circuit-breaker 15 may be reopened at time $t_7$, and the magnetic field applied to the superconductor element is terminated.

The superconducting element of the switch 14 is then allowed to cool to below its transition temperature—assuming that the passage of current through the superconducting switch and its terminals has raised the temperature of the superconductor element above the transition value—and the superconducting switch returns to its superconducting state.

A second circuit-breaker arrangement in accordance with the invention will now be described with reference to FIGS. 3 and 4.

In FIG. 3, the generator transformer 11 is connected to the line 12 through a superconducting switch 23, in series with which is a conventional circuit-breaker 24; the switch 23 may be as described with reference to FIGS. 5–8 below, and the system may be suitable for 400 kv. The conventional circuit-breaker may be as described in U.S. patent application Ser. No. 31,881. A suitable high-value capacitor 25 and high-value resistor 26 are connected in parallel with each other and with the switch 23. The value for the capacitor may, for example, be 0.25 microfarad, and for the resistor 88 ohms. Means is provided, including a relay responsive to a fault condition on line 12, a pulsing device and a pulse transformer, to apply a critical magnetic field to the superconductor element through a control winding in juxtaposition with the superconductor element. A relay is also provided which is responsive to current zero, which is arranged to operate after the fault-condition-responsive relay, and which operates to open the circuit-breaker 24.

The switch 23 is normally maintained in its superconducting state by refrigeration and since its resistance is substantially zero it is capable of carrying the normal current continuously. It is arranged that, when a fault occurs and the current thus rises, the fault-condition-responsive relay operates to switch the superconductor switch by the application of a magnetic field, to its normal high-resistance state. In this state its resistance may be, say, 300 ohms at 9° K. and 10,000 ohms at room temperature. The switching may be arranged to occur at, say, twice the rated current, and is effected very quickly, so that the fault current is limited.

Referring to FIG. 4, the trace 27 represents the system voltage and the trace 28 represents the current. The fault is assumed to occur at time $T_1$, and the switch 23 is switched to its normal high-resistance state at time $T_2$. The capacitor 25 and resistor 26 prevent excessive voltages being developed across the switch 23, and also bring the current and voltage nearly into phase. The relay connected to circuit-breaker 24 opens it at the next current zero (time $T_3$), which is thus substantially also a voltage zero. As soon as the circuit-breaker 24 clears, the switch 23 is allowed to return to its superconducting state by termination of the magnetic field.

As shown in FIG. 4, as soon as the superconducting switch 23 is switched to its high-resistance state, the current through it (dotted line 29) falls almost instantaneously, and the fault current in the circuit is also limited by the high value of resistor 26 and falls rapidly after the peak value.

Referring now to FIGS. 5, 6, 7 and 8, there is shown one practical embodiment of a superconducting switch.

This includes a conductor element in the form of a long continuous niobium film 30, for example $10^{-5}$ cm. thick, 140 cm. wide and 170,000 cm. long, folded into 1,200 layers or convolutions. The view of FIGS. 5 and 7 shows a transverse section through the layers, and FIG. 6 shows the extent of one layer. The folds of the film are separated by sheets of insulating material 31, and adjacent each fold but separated from it by a thin sheet of insulating material **31*a* (FIG. 7) is a control winding 32 which extends back and forth across the fold in a rectangular pattern (FIG. 6). The free ends of the control winding 32 are connected to the secondary 33 of a pulse transformer. The latter has a core 34 and a primary winding 35 which is taken out to control terminals 36. The control terminals 36 are connected to a pulsing device 80 of any known or convenient kind to supply an accurately-timed pulse a short time, e.g. ten microseconds, before current zero. It will be apparent that there are substantially the same number of control windings 32, and transformer secondaries 33, as there are layers of the niobium film 30. The secondaries 33** may, for example, be wound alternately on the two limbs of the core.

The superconductor film 30, control windings 32 and pulse transformer 33, 34, 35 are immersed in a tank 37 containing liquid helium 38 so that the superconductor element 30 is maintained below its transition temperature, which for niobium is 9° K. The sheets 31 of insulating material are provided with copper thermal conductors 39 which project into the liquid helium 38 to remove heat from the insulating material after the passage of a current through the superconductor element 30. The helium tank 37 is surrounded by high-quality thermal insulation 40, and this in turn is surrounded by a tank 41 containing liquid nitrogen 42. The tank 41 is surrounded by a further layer of thermal insulation 43.

Suitable refrigerators 81, 82 (FIG. 8) are provided which respectively supply the liquid helium to tank 37 and the liquid nitrogen to tank 41. Evaporated nitrogen gas may be allowed to escape, for example through vents 44, and hollow copper tubes 45 are provided extending from the exterior of the nitrogen tank 41 to the interior of the helium tank 37. Helium gas which escapes from the helium tank 37 through the copper tubes 45 is led to the refrigeration plant 81 in which the helium is recovered and from which it is supplied in liquid form to the tank 37.

A space 47 is provided above the level of the liquid helium 38 within the tank 37 for helium gas resulting from boiling of the helium due to dissipation of energy during the passage of the current through the superconductor element 30 of the switch. The surfaces of the insulators 31 projecting into the space 47 may be ridged to provide the necessary electrical breakdown strength. A safety valve may be provided to operate in the event of the sudden evolution of quantities of helium gas. The copper tubes 45 also serve as the terminals of the superconducting switch, by which it is connected in an external circuit; the copper tubes are connected to the two ends of the superconductor element 30.

In this case the pipes through which helium gas is led from the copper tubes 45 to the refrigeration plant 81 will be made of electrically-insulating material.

For a 270 kv. 3-phase system having a fault rating of 30,000 mva., three superconducting switches would of course be required, but these could be arranged in a single liquid helium tank. The control windings in the arrangement of FIG. 1 would be pulsed, say, 10 microseconds before current zero, so that the critical field is reached close to current zero; it is estimated that an energy of about 3,000 J. is required. In its normal high-resistance state the superconductor is heated to approximately room temperature (288° K.) by the dissipation of some 120,000 J. of energy in the quarter cycle before the current is finally interrupted. This energy diffuses rapidly through the insulation and the thermal conductors 39, allowing the superconductor element to become superconducting again in a short time. The power requirement for continuous refrigeration, using liquid helium, is about 9 w. for the 3-phase system.

What we claim as our invention and desire to secure by Letters Patent is:

1. In or for an alternating current electric circuit, a circuit-breaker arrangement including a normally-closed circuit-breaker, a superconducting switch, a normally-open circuit-breaker in series with said superconducting switch, said superconducting switch and said normally-open circuit-breaker being in parallel with said normally-closed circuit-breaker, and a series circuit-breaker which is in series at least with the superconducting switch and the normally-open circuit-breaker.

2. In or for an alternating current electric circuit, a circuit-breaker arrangement including a normally-closed circuit-breaker, a superconducting switch, means for applying a critical magnetic field to said switch to switch it from a superconducting state to a high-resistance state, a normally-open circuit-breaker in series with said superconducting switch, said superconducting switch and said normally-open circuit-breaker being in parallel with said normally-closed circuit-breaker, and a series circuit-breaker which is in series at least with the superconducting switch and the normally-open circuit-breaker.

3. In or for an alternating current electric circuit, a circuit-breaker arrangement including a normally-closed circuit-breaker, protective relay means responsive to a fault condition in said electric circuit and connected to said normally-closed circuit-breaker to open it when a fault condition occurs, a superconducting switch having a superconducting state and a high-resistance state, a normally-open circuit-breaker in series with said superconducting switch, said superconducting switch and said normally-open circuit-breaker being in parallel with said normally-closed circuit-breaker, means to close said normally-open circuit-breaker before current zero, means to switch said superconducting switch at current zero from its superconducting state to its high-resistance state, a series circuit-breaker which is in series at least with the superconducting switch and the normally-open circuit-breaker, and means to open said series circuit-breaker after said current zero to interrupt the residual current flowing in the superconducting switch in its high-resistance state.

4. In or for a high-power alternating current electrical circuit, a circuit-breaker arrangement comprising a superconducting switch having a superconducting element which has a superconductive state in which it is capable of continuously carrying the normal current flowing in the high-power circuit, said element further having a normal high-resistance state and a transition temperature, refrigeration means normally to maintain said superconducting element below its transition temperature, means to apply a critical magnetic field to said superconducting element to change said element from its superconductive state to its normal high-resistance state, whereby the current flowing through said superconducting element falls rapidly to a low value, high-value capacitor means connected in parallel with said superconducting switch, and high-value resistor means connected in parallel with said capacitor means and with said superconducting switch, whereby to prevent excessive voltages being developed across said superconducting switch, and whereby the current flowing through said switch and the voltage across it are brought more nearly into phase, said circuit-breaker arrangement also comprising a series circuit-breaker connected in series with said superconducting switch to interrupt said low value of current.

References Cited

UNITED STATES PATENTS

| | | | |
|---|---|---|---|
| 2,352,713 | 7/1944 | Hodgkins | 317—11 X |
| 3,187,229 | 6/1965 | Kunzler. | |
| 3,188,488 | 6/1965 | Smallman et al. | 307—88 |

MILTON O. HIRSHFIELD, *Primary Examiner.*

J. D. TRAMMELL, *Assistant Examiner.*